April 3, 1951    K. HURST    2,547,467
SELF-ADJUSTING NOSE PAD AND BROW REST FOR OPTICAL FRAMES
Filed March 8, 1949
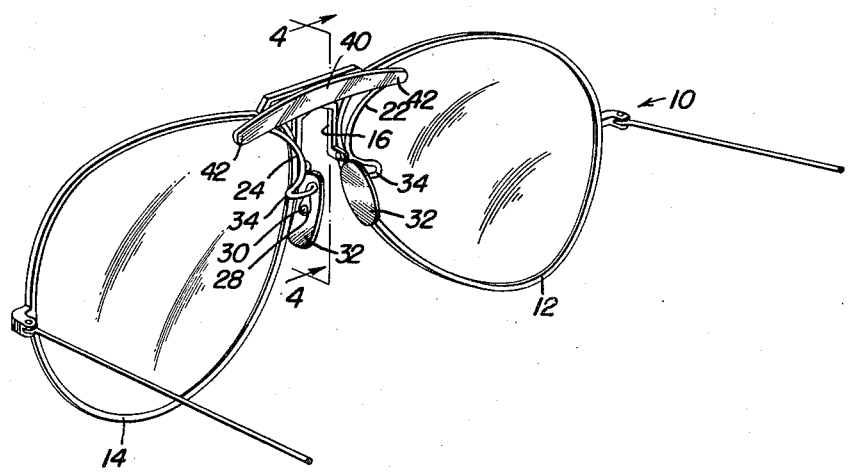
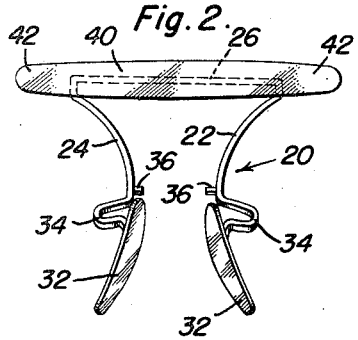
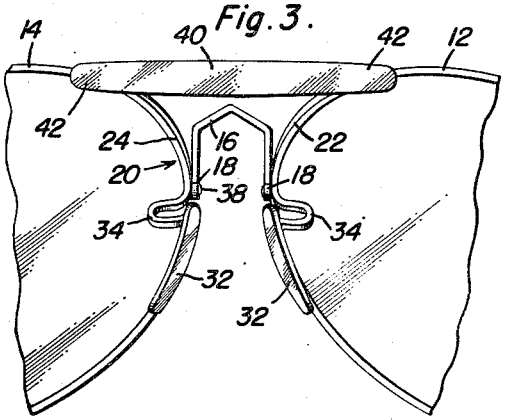
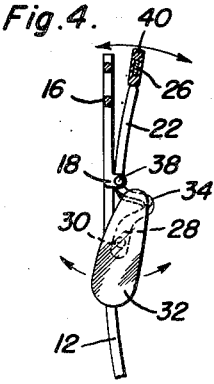
Inventor
Kenneth Hurst
By Clarence A. O'Brien
and Harvey B. Jacobson
Attorneys Patented Apr. 3, 1951

2,547,467

UNITED STATES PATENT OFFICE 2,547,467

SELF-ADJUSTING NOSE PAD AND BROW REST FOR OPTICAL FRAMES

Kenneth Hurst, Chattanooga, Tenn.

Application March 8, 1949, Serial No. 80,278

10 Claims. (Cl. 88—49)

This invention relates to new and useful improvements in optical frames and more particularly to a nose rest support for optical frames.

The primary object of the present invention is to provide a self-adjusting nose pad and brow rest for optical frames.

Another important object of the present invention is to provide a swingable frame supporting a forehead contacting element, a pair of nose pads and embodying novel and improved means for quickly and readily applying the same to or removing the same from an optical frame in a convenient manner.

Yet another object of the present invention is to provide a self-adjusting nose pad and brow rest for optical frames that is extremely small and compact in structure and which will in no way interfere with the normal use or visibility through the lens of an optical frame on which the same is applied.

A further object of the present invention is to provide an attachment for optical frames including a nose pad support so constructed as to permit the pads carried thereby to bear against a user's nose in a comfortable manner.

A still further aim of the present invention is to provide a self-adjusting nose pad and brow rest for optical frames that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary perspective view of an optical frame and showing the present invention applied thereon;

Figure 2 is a front elevational view of the present invention per se;

Figure 3 is a fragmentary rear elevational view of Figure 1; and

Figure 4 is a transverse vertical sectional view taken substantially on the plane of section line 4—4 of Figure 1.

Referring now to the drawings in detail, wherein for the purpose of illustration, there is disclosed a preferred embodiment of the present invention, the numeral 10 represents a conventional and well known optical frame generally, including lens supporting frame members 12 and 14 that are joined by a substantially U-shaped nose bridge 16 having laterally projecting ears or apertured lugs 18 to which nose pads are normally secured.

The present invention does not attempt to claim the above structure but is rather an attachment used in conjunction therewith for supporting the nose pads.

To accomplish the desired results, there is provided a resilient or spring metal frame member, designated generally by the numeral 20, and including a pair of arcuate side portions 22 and 24 having one of their ends joined by a cross member 26 that is preferably integrally formed with the side portions.

The free ends 28 of the side portions 22 and 24 are preferably flattened and are pivoted, as at 30, to a pair of well known, elliptical, concavo convexed nose pads 32.

Loops 34 are pressed outwardly from the side portions 22 and 24, adjacent the nose pads 32, to permit slight adjustment of the nose pads with respect to the shape of a user's nose and to provide a spring means for normally urging the nose pads toward each other.

Suitably fixed to and projecting laterally from the portions 22 and 24, adjacent the loops 34, is a pair of coaxial studs or trunnions 36 that are pivotally received in the apertures provided in the ears 18. Due to the resilient characteristics of the frame member 20, the trunnions 36 will be retained in position to the ears 18, however, the free ends of the trunnions may be flattened, as at 38, to positively retain the frame members 20 relative to the nose bridge 16.

Embracing and suitably fixed to the cross member 26, is a resilient forehead engaging element or pressure member 40 having a concaved inner surface conforming to the contour of a user's forehead and end portions 42 that project outwardly of the side portions 22 and 24 to provide an additional bearing area for the element 40.

In practical use of the present invention, the swingable support or frame member 20 will be self-adjusted as the user applies the optical frame 10 in a comfortable position on his nose. When in this position, the member 40, including its end portions 42, will comfortably bear against the user's forehead.

Although the present invention has been described as particularly applicable for optical lenses having ears 18, it is apparent that the frame member 20 could be pivotally secured to the lens holding frames 12 and 14 without departing from the scope of the present invention. Also, some optical frames are constructed with rigid nose pieces or nose pads that are integrally formed with the lens holding frames 12 and 14. In this instance, portions of the rigid nose pad members can be removed in order that the frame member 20 may be pivotally applied to the optical frame or the frame member 20 may be pivoted to the rigid nose pad members without the necessity of having to remove any material.

It is preferred that the forehead contacting member 40 be constructed of the same material as the nose pads 32. However, any suitable plastic or resilient material may be utilized in order to provide a surface which will comfortably bear against the user's forehead.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Obviously, studs or pins may be fixed to and project from the ears 18 for reception in apertures provided in the portions 22 or 24 since this construction is a mere reversal of parts previously described for joining the portions 22 and 24 to the frame 16.

Having described the invention, what is claimed as new is:

1. In combination with an optical frame having a fixed nose bridge and ears projecting laterally from said bridge, a nose rest support comprising a frame member having a pair of spaced portions, means carried by said portions engaging said ears for pivotal movement of said frame member relative to said nose bridge, nose gripping pads pivoted to said portions and disposed below said ears, and a forehead contacting element carried by and movable with said frame member, said element extending transversely between said portions and being disposed above said pads.

2. The combination of claim 1 wherein said frame member is constructed of resilient material.

3. The combination of claim 1 wherein said first mentioned means includes a pair of coaxial trunnions fixed to said portions.

4. The combination of claim 1 wherein said element includes an elongated member having a concaved bearing surface.

5. The combination of claim 1 and loops depressed from said portions adjacent said cushioning means.

6. In an optical frame including a fixed nose bridge and ears projecting from said nose bridge, a nose rest support comprising a pair of side portions having upper and lower ends, a cross member integrally formed with the upper ends of said portions, a forehead contacting element secured to said cross member, pivot pins fixed to said portions and pivotally received by said ears, loops pressed from said portions adjacent and below said ears, and nose pads pivoted to the lower ends of said portions adjacent said loops, said loops yieldingly urging said nose pads spaced from said pivot pins and also yieldingly urging the nose pads toward each other.

7. In an optical frame including a fixed nose bridge and ears projecting from said bridge, a self-adjusting nose pad and brow rest comprising, a cross member, a pair of arms depending from said cross member, said arms having lower end portions terminating in loops, nose pads, pivot pins securing said nose pads to said loops, said nose pads yieldingly urged toward each other by said loops, a brow contacting member supported on said cross member, and co-axial pins secured to said arms, paralleling the brow contacting member and engaged with said ears for swinging movement of said arms on said nose bridge and movement of said brow contacting member toward and away from said nose bridge.

8. In combination with an optical frame including a pair of lens holding members and a nose bridge joining said members, an attachment for the nose bridge, said attachment comprising a spring metal frame member including a pair of arcuate side portions having upper ends and a cross member connecting the upper ends of said side portions, nose pads pivotally supported on the side portions, substantially U-shaped loops provided in said side portions adjacent said nose pads for yieldingly urging said nose pads toward each other, means pivotally securing said side portions to said nose bridge for swinging movement of said cross member toward and away from said lens holding members, and a forehead engaging element embracing and fixed to said cross member.

9. A self-adjusting nose pad and brow rest for optical frames comprising a spring metal frame member including a pair of arcuate side portions having upper and lower ends and a cross member joining the upper ends of said side portions, said side portions having inner convexed surfaces and outer concaved surfaces, substantially U-shaped loops projecting laterally from the concaved surfaces of said side portions and disposed at the lower ends of said side portions, said loops having lower legs, nose pads, pivots securing the nose pads to the lower legs of said loops, said loops yieldingly urging said nose pads toward each other, and a forehead contacting element supported upon the cross member.

10. In combination with an optical frame, a self-adjusting nose pad and brow rest comprising a substantially U-shaped resilient frame member having spreadable leg portions, said leg portions having lower ends, loops at the lower ends of said leg portions, nose pads pivoted to said loops and urged toward each other by said loops, a brow contacting member secured to said frame member and extending transversely between said leg portions, and pivot means for securing the leg portions to said optical frame for swinging movement of said brow contacting element toward and away from said optical frame.

KENNETH HURST.

REFERENCES CITED

The following references are of record in the file of this patent:

UNITED STATES PATENTS

| Number | Name | Date |
| --- | --- | --- |
| 1,193,983 | Brinkhans | Aug. 8, 1916 |
| 1,238,396 | Elwood | Aug. 28, 1917 |
| 1,381,603 | Updegrave et al. | June 14, 1921 |
| 1,577,700 | Edwards | Mar. 23, 1926 |

FOREIGN PATENTS

| Number | Country | Date |
| --- | --- | --- |
| 72,234 | Germany | Feb. 28, 1893 |